United States Patent Office 2,752,333
Patented June 26, 1956

2,752,333

METALLIZED AZO DYES FROM DIAMINODIBENZOTHIOPHENE DIOXIDES

Hans Z. Lecher, Plainfield, and Sien Moo Tsang, Middlesex, N. J., assignors to American Cyanamid Company, New York, N. Y., a corporation of Maine No Drawing. Application November 25, 1952,
Serial No. 322,566

6 Claims. (Cl. 260—146)

This invention relates to new azo dyes and more specifically, to metal complexes of azo dyes derived from a 3,7-diaminodibenzothiophene-5,5-dioxide intermediate having the formula

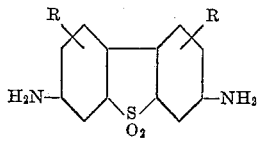

in which R is a substituent either capable of complexing with metal ions or readily converted into such complexing groups. Examples of known complexing groups are hydroxy, carboxyl, lower alkoxy and halogen, the latter two being converted into hydroxy during metallization. The substituent R is attached to carbon atoms ortho to the 3,7-positions.

The above intermediate is diazotized and reacted with aromatic coupling components to form azo dyes which, together with their metal complexes, are the subject of this invention. It is a characteristic of our new dyestuffs that the aromatic nucleus is substituted by one or more sulfonic acid groups.

Metallized azo dyes of blue shades, especially the greener shades of blue, are comparatively rare. Especially is this true for green shades of blue with good light fastness. The bases which can be used to give such blue shades permit only a narrow variation in the shades obtainable.

The metallized dyes of the present invention are characterized by their excellent fastness and strength and in general by their valuable property of substantivity for cellulosic materials. They are particularly useful in that the shades are of a wide range and most especially, in that very green shades of blue of good lightfastness can be obtained. It is most surprising that this should be so, for one skilled in the art could not predict that the dibenzothiophene dioxide nucleus would have this marked effect on the shade and lightfastness obtainable from such dyes. The metalliferous dyestuffs of the present invention are particularly suitable for coloring cellulosic fibers, but can also be used for animal fibers (wool and silk), rayon, nylon, leather, paper, etc.

It is an advantage of the present invention that the usual techniques of diazotization, coupling, and metallization can be applied. The choice of coupling components is limited only by the requirement that a metallizable group be present ortho to the point at which coupling takes place. Some of the coupling components which can be used include 4-sulfoacetoacetanilide and its derivatives; 1-(4-sulfophenyl)-3-methylpyrazolone; 6-amino-1-naphthol-3-sulfonic acid; 7-amino-1-naphthol-3-sulfonic acid; 1-naphthol-4-sulfonic acid; 8-amino-1-naphthol-5,7-disulfonic acid; 8-amino-1-naphthol-3,6-disulfonic acid and its N-acetyl derivatives; 2-naphthol-3,6-disulfonic acid; 2-naphthol-6-sulfonic acid; 7-phenylamino-1-naphthol-3-sulfonic acid; 6-phenylamino-1-naphthol-3-sulfonic acid; 8-amino-1-naphthol-5-sulfonic acid; and 3-sulfobenzoylacetonitrile. Those coupling components which have free amino groups can be further diazotized and coupled to modify the shades of the resulting dyes to greys, browns, and blacks. Conversely, the tetrazotized diaminodibenzothiophene dioxides can be coupled into compounds already containing the azo linkages. The coupling of the tetrazo can be carried out stepwise and couplings can be made into different coupling components on each side.

The 3,7-diaminodibenzothiophene-5,5-dioxide intermediates may be prepared by treating the properly substituted benzidine or its acylated derivative with oleum by methods known to the art to produce the heterocyclic ring. Thus, when dianisidine is acetylated and so treated, a sulfonated dimethoxy-3,7-diamino dibenzothiophene-5,5-dioxide is obtained by deacylation of the product. The position of the methoxy groups is not known for certain, except that they are on carbons ortho to the amino groups. By similar methods, chloro and methyl derivatives can be obtained by treating dichlorobenzidine and tolidine with oleum. Alkyl derivatives so prepared can be oxidized to carboxy derivatives and free hydroxy groups can be prepared from the alkoxy compounds. Unsulfonated sulfones may be prepared by methods that do not involve sulfonation, or if sulfonic acid groups are introduced they may be removed by refluxing with dilute acid (see Example 1 below).

The presence of sulfonic acid groups in our azo dyestuffs is required to increase water-solubility. It will be obvious that such solubilizing groups may be present either in the diaminodibenzothiophene dioxide nucleus or in the coupling component, or both. Thus, when starting with a sulfonated diaminodibenzothiophene dioxide one may couple with such compounds as beta-naphthol; alpha-naphthol; 1-amino-7-naphthol; p-cresol; hydroquinone monomethyl ether; 2, 4-dihydroxyquinoline; 1-phenyl-3-methylpyrazolone-5, acetoacetanilide and benzoylacetonitrile, as well as with the sulfonated coupling components mentioned above.

The unmetallized dyestuffs produced by coupling the diaminodibenzothiophene dioxides described above with coupling components such as have been described, can be converted into their metal complexes in substance or on the fiber by treatment with water-soluble salts of metals having atomic weights from 52 to 64. These salts include the water-soluble sulfates, halides, formates and acetates of chromium, copper, nickel, manganese, and iron.

Thus, metal derivatives of the above dyestuffs can be obtained by reacting the metal-free dyestuffs with chromium fluoride, chromium chloride, chromium acetate, chromium sulfate, copper sulfate, copper acetate, nickel sulfate, etc., in the presence of water and/or an organic solvent, such as pyridine, ethyl alcohol, etc. Of particular value, especially for cellulosic fibers, are the copper complexes. These may be readily prepared, even though the metallizable group is alkoxy or halogen, by heating with an ammoniacal solution of copper sulfate, for a number of hours. If desired, the ammonia can be replaced by organic amines, i. e., ethanolamine or ethylenediamine. The metalliferous dyestuffs may be precipitated from aqueous solution by the addition of common salt or Glauber's salt and are recovered by filtration. When the metalliferous dyestuff is prepared in solution in an organic solvent, it may be recovered as a residue by evaporation of the solvent.

Our invention is illustrated by the following examples which are specific embodiments of the invention. Variations will be obvious to those skilled in the art. Parts are by weight unless otherwise specified.

Example 1

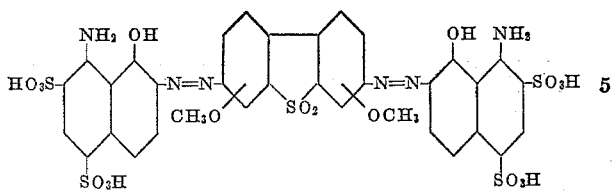

Two hundred forty-four parts of dianisidine is slurried in 315 parts of glacial acetic acid and gradually treated with 236 parts of acetic anhydride. Acetylation is completed by refluxing, the mixture being cooled and filtered. The product, diacetyl dianisidine, melts at about 243° C. after being washed with alcohol.

32.8 parts of the above prepared diacetyl dianisidine is dissolved gradually in 330 parts of 35% oleum at 15–30° C. The solution is slowly heated to 60° C. and stirred at this temperature for three hours. The resulting dark red solution is drowned in 1600 parts of ice and water. The resulting solution is heated to 95–100° C. for one hour, cooled to room temperature, and filtered. The yellow product is washed with ethanol and dried.

Sixty parts of the dimethoxy-3,7-diaminodibenzothiophene-5,5-dioxide monosulfonic acid so prepared is heated under reflux with 2,800 parts of 50% sulfuric acid for five days. The resulting solution is diluted with 18,000 parts of water. The precipitated product, hydroxymethoxydibenzothiophene-5,5-dioxide, is separated by filtration, followed by washing with water.

23.4 parts of the hydroxymethoxy derivative obtained as above is slurried in a mixture of 210 parts of acetic acid and 208 parts of acetic anhydride. Acetylation of the amino groups is completed by heating at 100–105° C. for one hour. The mixture is then cooled to room temperature and filtered. The product is washed with benzene and dried.

The above-prepared diacetaminohydroxymethoxydibenzothiophene-5,5-dioxide is methylated with 31.3 parts of dimethyl sulfate and 76.6 parts of 5 N sodium hydroxide solution in 750 parts of water at 26–28° C. over a period of about three hours. The product is filtered and washed first with dilute sodium hydroxide solution, and then with water. Dimethoxy-3,7-diaminodibenzothiophene-5,5-dioxide is prepared by hydrolyzing the filter cake with 825 parts of 15% sulfuric acid solution at reflux for about three hours. The product precipitates from the solution as sulfate salt in yellow crystals. It is filtered, washed with ethanol, and dried.

Four and four one-hundredths parts of the sulfate salt of dimethoxy-3,7-diaminodibenzothiophene-5,5-dioxide is dissolved in 23.8 parts of concentrated hydrochloric acid and 100 parts of water. The mixture is cooled to 10° C. and the amine is tetrazotized by the gradual addition of 20 parts of a normal solution of sodium nitrite. The tetrazo solution is added to a solution of 8.0 parts of 8-amino-1-naphthol-5,7-disulfonic acid as monosodium salt in 49.1 parts of pyridine and 200 parts of water containing 23.3 parts of sodium carbonate. The reaction mixture is stirred until coupling is substantially complete and the pyridine is then removed by evaporation. The residual liquor is diluted with 500 parts of water and treated with 100 parts of salt, followed by acidification with hydrochloric acid. The precipitated product is isolated by filtration. It dyes cotton a greenish blue.

Example 2

The product from Example 1 is metallized by heating with 6.25 parts of copper sulfate, 27 parts of 15 normal ammonium hydroxide and 120 parts of water at 85–90° C. until metallization is complete. The product is precipitated by the addition of salt and filtered. It can be purified by treating its aqueous solution with charcoal. It dyes cotton a very greenish blue of excellent fastness.

Example 3

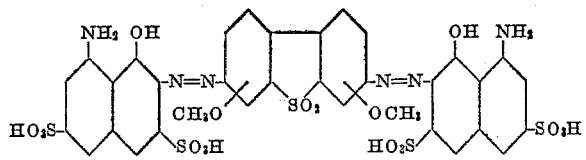

Dimethoxy-3,7-diaminodibenzothiophene-5,5-dioxide is tetrazotized as described in Example 1. The tetrazo solution is added gradually to a solution of 8.0 parts of 8-amino-1-naphthol-3,6-disulfonic acid as monosodium salt in 49.1 parts of pyridine and 160 parts of water containing 9.4 parts of sodium carbonate. The reaction mixture is stirred until the reaction is complete. The pyridine is substantially removed by distillation and the product isolated by adding salt and filtering. The product dyes cotton greenish-blue shades.

Example 4

The product from Example 3 is metallized by the procedure of Example 2. The metalliferous dyestuff is isolated by salting to a concentration of 20% and filtering. It dyes cotton a very green shade of blue of excellent fastness.

Example 5

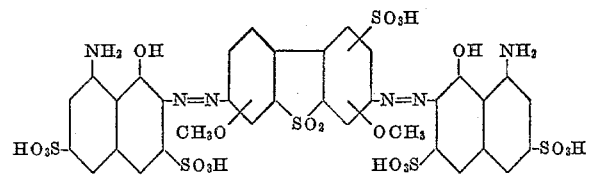

To a slurry of 9.65 parts of dimethoxy-3,7-diaminodibenzothiophene-5,5-dioxide monosulfonic acid in 23.2 parts of 10 normal hydrochloric acid and 200 parts of water, stirred at 10° C., is added gradually 8.7 parts of a 40% sodium nitrite solution. The resulting slurry of the tetrazo compound is added gradually to a solution of 19.1 parts of 8-amino-1-naphthol-3,6-disulfonic acid as monosodium salt in 16.2 parts of 5 N sodium hydroxide solution, 26.5 parts of sodium carbonate, and 400 parts of water. The reaction mixture is stirred until coupling is complete. The product is isolated by the addition of 200 parts of salt, followed by heating, cooling, and filtering. It dyes cotton greenish-blue shades.

Example 6

Sixteen and six-tenths parts of the product of Example 5 is metallized by heating with 9.36 parts of copper sulfate, 34.6 parts of 15 normal ammonium hydroxide and about 200 parts of water until the reaction is complete. The product is isolated by adding 50 parts of salt and filtering. It dyes cotton a very green shade of blue of good fastness.

Example 7

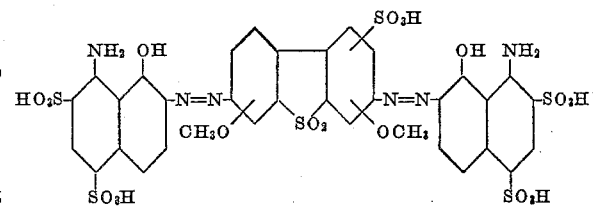

Dimethoxy-3,7-diaminodibenzothiophene-5,5-dioxide monosulfonic acid is tetrazotized as described in Example 5. The tetrazo solution is added gradually, after being diluted with 150 parts of water and clarified by filtration, to a solution of 16.8 parts of 8-amino-1-naphthol-5,7-disulfonic acid as monosodium salt in 16.5 parts of 5 N sodium hydroxide, 26.5 parts of sodium carbonate, and 250 parts of water at 10–15° C. The mixture is stirred until the reaction is complete. The product is isolated as copper salt by salting with copper sulfate.

Example 8

The product from Example 7 is metallized by heating with a solution of 15.0 parts of copper sulfate in 61.6 parts of 15 normal ammonium hydroxide and about 120 parts of water until the reaction is complete. The product is isolated by salting and filtering. It dyes cotton a very green shade of glue of excellent fastness.

Example 9

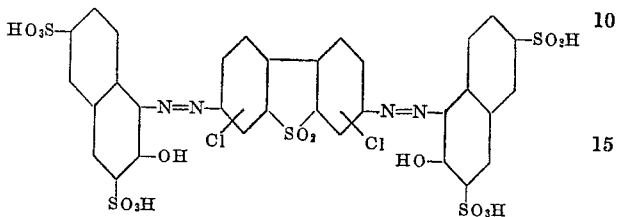

To a solution of 6.3 parts of dichloro-3,7-diaminodibenzothiophene-5,5-dioxide in 87 parts of 98% sulfuric acid is added gradually 3.04 parts of sodium nitrite, keeping the temperature about 40° C. The mixture is stirred until tetrazotization is complete and then poured on 150 parts of ice. The resulting solution is added, together with 91 parts of sodium carbonate, gradually to a solution of 15.3 parts of sodium 2-naphthol-3,6-disulfonate in 330 parts of water and 150 parts of pyridine at 10–15° C. keeping the mixture cold by internal icing. The mixture is stirred until coupling is complete. The product is isolated by filtering. It dyes cotton a bluish-red shade.

Example 10

Five and two one-hundredths parts of the product of Example 9 is metallized by heating with a solution of 3.75 parts of copper sulfate in 13.8 parts of 15 normal ammonium hydroxide and 12 parts of water in an autoclave until the reaction is complete. The product dyes cotton a bright reddish blue. The metallization can also be carried out by the methods of previous examples.

Example 11

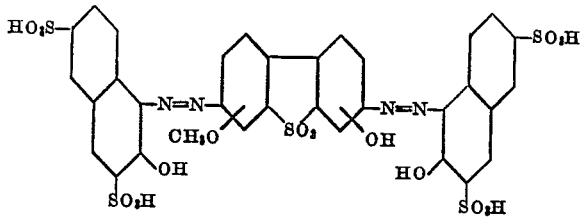

To a slurry of 3.15 parts of hydroxymethoxy-3,7-diaminodibenzothiophene-5,5-dioxide (obtained by the method described in Example 1) in 83.5 parts of 2.5 normal hydrochloric acid is added gradually 21 parts of a normal sodium nitrite solution, keeping the mixture at 15° C. The resulting tetrazo solution, after being clarified, is added to a mixture of 10.5 parts of sodium-2-naphthol-3,6-disulfonate, 8.4 parts of sodium hydroxide, 196.4 parts of pyridine, and 235 parts of water at 15–20° C. The mixture is stirred until coupling is complete. The product is isolated by filtration. It dyes cotton reddish-blue shades.

Example 12

Four and five-tenths parts of the product of Example 11 is metallized by heating with 2.5 parts of copper sulfate, 10.8 parts of 15 normal ammonium hydroxide, and 105 parts of water at 85–90° C. until the reaction is complete. The product is isolated by treating the mixture with 25 parts of salt and adding a small amount of hydrochloric acid and ethanol. It dyes cotton a red shade of blue of excellent fastness.

We claim:

1. Metal complexes of azo dyes having the formula

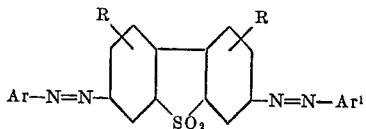

in which R is a metallizable group ortho to the azo linkage and Ar and Ar¹ are radicals of aromatic coupling components substituted by metallizable groups in a position ortho to the azo group; said azo dyes being sulfonated, said metal complexes being derived from metals of atomic weight from 52 to 64.

2. Products according to claim 1 in which said metal has an atomic weight of at least 52 but not more than 64.

3. The products according to claim 2 in which the metal is copper.

4. The copper complex of the dye of the formula

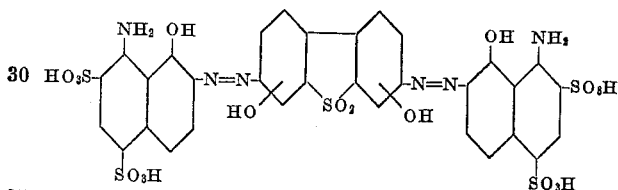

in which the hydroxyl groups are on carbons ortho to the azo linkages.

5. The copper complex of the dye of the formula

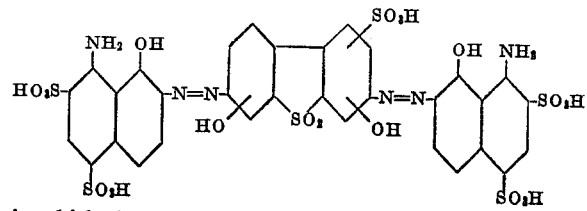

in which the hydroxyl groups are ortho to the azo linkages.

6. The copper complex of the dye of the formula

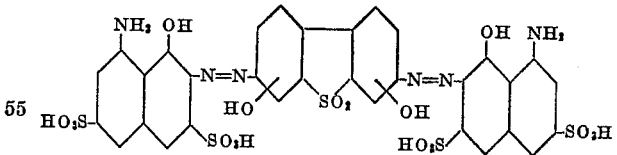

in which the hydroxyl groups are ortho to the azo linkage.

References Cited in the file of this patent

UNITED STATES PATENTS

| Number | Name | Date |
|---|---|---|
| 432,989 | Duisberg | July 29, 1890 |
| 499,216 | Duisberg | June 13, 1893 |
| 2,138,553 | Muth | Nov. 29, 1938 |